United States Patent
Mizuno et al.

(10) Patent No.: US 9,889,778 B2
(45) Date of Patent: Feb. 13, 2018

(54) ARMREST STRUCTURE FOR DOOR TRIM

(71) Applicants: NIFCO INC., Yokosuka-shi (Kanagawa) (JP); TOYOTA BOSHOKU KABUSHIKI KAISHA, Kariya-shi (Aichi) (JP)

(72) Inventors: Kanako Mizuno, Yokosuka (JP); Yuji Sasaki, Yokosuka (JP); Fumitaka Hirose, Kariya (JP); Kazumi Kojima, Kariya (JP); Hironori Akabane, Kariya (JP); Yasuo Saida, Kariya (JP); Yuji Ito, Toyota (JP); Iwao Udatsu, Toyota (JP)

(73) Assignees: NIFCO INC., Yokosuka-Shi (Kanagawa) (JP); TOYOTA BOSHOKU KABUSHIKI KAISHA, Kariya-Shi (Aichi) (JP)

( * ) Notice: Subject to any disclaimer, the term of this patent is extended or adjusted under 35 U.S.C. 154(b) by 0 days.

(21) Appl. No.: 15/038,110

(22) PCT Filed: Nov. 25, 2014

(86) PCT No.: PCT/JP2014/081127
§ 371 (c)(1),
(2) Date: May 20, 2016

(87) PCT Pub. No.: WO2015/076418
PCT Pub. Date: May 28, 2015

(65) Prior Publication Data
US 2016/0288674 A1    Oct. 6, 2016

(30) Foreign Application Priority Data

Nov. 22, 2013 (JP) .................. 2013-242277

(51) Int. Cl.
| | |
|---|---|
| *B60N 2/46* | (2006.01) |
| *B60N 2/42* | (2006.01) |
| *B60R 13/02* | (2006.01) |

(52) U.S. Cl.
CPC .......... *B60N 2/466* (2013.01); *B60N 2/4235* (2013.01); *B60R 13/0243* (2013.01)

(58) Field of Classification Search
CPC ....................................... B60N 2/466
(Continued)

(56) References Cited

U.S. PATENT DOCUMENTS 2,203,413 A * 6/1940 Hood ............... B60N 2/466
                                                      297/411.21
4,597,606 A * 7/1986 Magee ............... A47C 7/54
                                                      248/118

(Continued)

FOREIGN PATENT DOCUMENTS

| JP | 6-270676 A | 9/1994 |
|---|---|---|
| JP | 2005-47375 | 2/2005 |

(Continued)

OTHER PUBLICATIONS

International Search Report and Written Opinion of Application No. PCT/JP2014/081127 dated Mar. 3, 2015.

(Continued)

*Primary Examiner* — Dennis H Pedder
(74) *Attorney, Agent, or Firm* — Thomas | Horstemeyer, LLP

(57) ABSTRACT

An armrest structure for door trim has an armrest lower, an armrest upper, and a joining component that joins the armrest upper and the armrest lower together, wherein the joining component is provided with a strap portion, and an anchor portion, and wherein the attachment hole has a wider portion through which the anchor portion can be inserted, (Continued)

and a narrower portion through which the anchor portion cannot be inserted, and during a process to assemble the armrest upper and the armrest lower together, the anchor portion is inserted through the wider portion, and once the armrest upper and the armrest lower are in an assembled state, the anchor portion is located at a position underneath the narrower portion of the attachment hole that is formed in the armrest lower.

8 Claims, 15 Drawing Sheets

(58) Field of Classification Search
USPC .......... 296/153, 1.09, 187.05; 280/748, 751; 297/411.21

See application file for complete search history.

(56) References Cited

U.S. PATENT DOCUMENTS

| | | | | |
|---|---|---|---|---|
| 4,932,105 | A | * | 6/1990 | Muller .................. B60N 2/466 24/297 |
| 5,951,094 | A | * | 9/1999 | Konishi ............... B60N 2/4673 280/751 |
| 7,055,888 | B2 | * | 6/2006 | Reed ...................... B60N 2/466 296/153 |

FOREIGN PATENT DOCUMENTS

| | | |
|---|---|---|
| JP | 2008-143416 | 6/2008 |
| JP | 2010-126050 | 6/2010 |

OTHER PUBLICATIONS

First Office Action dated May 2, 2017 for corresponding CN Application No. 201480062845.1.

* cited by examiner

ARMREST STRUCTURE FOR DOOR TRIM

CROSS-REFERENCE TO RELATED APPLICATIONS

This application is the National Stage of International Application No. PCT/JP2014/081127, filed 25 Nov. 2014, having the title "ARMREST STRUCTURE FOR DOOR TRIM" which claims the benefit of and priority to Japanese Application No. 2013-242277, filed on 22 Nov. 2013, the contents of all of which are incorporated by reference as if fully set forth herein.

TECHNICAL FIELD

The present invention relates to an armrest structure for door trim in which the impact absorption performance is improved as a result of a top portion of an armrest that is provided on the door trim coming away from the door trim.

BACKGROUND ART

In an armrest structure for door trim that is described in Japanese Patent Application Laid-Open (JP-A) No. 2008-143416, in the event of a side impact or the like, an armrest upper comes away from an armrest lower that is provided on the door trim. As a consequence, the armrest lower is reliably crushed by the impact load, and the vehicle occupant is thereby protected.

SUMMARY OF INVENTION

Technical Problem

However, in the armrest structure for door trim described in Japanese Patent Application Laid-Open (JP-A) No. 2008-143416, the armrest upper that has come away from the armrest lower provided on the door trim falls inside the vehicle cabin. One way to prevent the armrest upper that has come away from the armrest lower from falling inside the vehicle cabin that might be considered is to join the armrest upper and the armrest lower together by means of a band or the like. However, in this case, the assembly work becomes more complex, and the assembling workability performance is poor.

The present invention was conceived in view of the above-described circumstances, and it is an object thereof to provide an armrest structure for door trim that is able to prevent an armrest upper that has come away from an armrest lower from falling inside a vehicle cabin, and that is also able to provide improved assembling workability.

Solution to the Problem

An armrest structure for door trim according to a first aspect of the present invention has an armrest lower that is formed on a door trim, an armrest upper that is attached to a top portion of the armrest lower, and a joining component that joins the armrest upper and the armrest lower together, wherein the joining component is provided with a strap portion that has one end portion joined to one of the armrest upper or the armrest lower, and that is inserted through an attachment hole formed in the other one of the armrest upper or the armrest lower, and an anchor portion that is formed at another end portion of the strap portion, and wherein the attachment hole has a wider portion through which the anchor portion can be inserted, and a narrower portion through which the anchor portion cannot be inserted, and during a process to assemble the armrest upper and the armrest lower together, the anchor portion is inserted through the wider portion, and once the armrest upper and the armrest lower are in an assembled state, the anchor portion is located at a position underneath the narrower portion of the attachment hole that is formed in the armrest lower.

According to the above-described structure, one end portion of the joining component is joined to one of the armrest upper or the armrest lower. During a process to assemble the armrest upper and the armrest lower together, the anchor portion of the joining component is inserted through the wider portion of the attachment hole. Because of this, by passing the anchor portion of the joining component through the attachment hole, the armrest upper and the armrest lower can be easily joined together by the joining component. As a result, the assembling workability is improved.

On the other hand, once the armrest upper and the armrest lower are in their assembled state, the strap portion that is formed in the joining component has been inserted through the attachment hole, and the anchor portion is positioned underneath the narrower portion of the attachment hole formed in the armrest lower. Because of this, in the event of a side impact or the like, if the armrest upper that is attached to a top portion of the armrest lower formed in the door trim comes away from the armrest lower, then the anchor portion that is located underneath the narrower portion of the attachment hole formed in the armrest lower is held back by the peripheral rim portion of the narrower portion of the attachment hole, and the armrest upper is maintained in a state of being joined to the armrest lower. As a result, the armrest upper can be prevented from falling inside the vehicle cabin.

The armrest structure for door trim according to a second aspect of the present invention is characterized in that, in the armrest structure for door trim according to the first aspect, the anchor portion becomes gradually narrower towards a distal end in a direction of insertion through the attachment hole.

According to the above-described structure, because the anchor portion becomes gradually narrower towards a distal end in a direction of insertion through the attachment hole, during an assembly operation the anchor portion can be easily inserted through the attachment hole.

The armrest structure for door trim according to a third aspect of the present invention is characterized in that, in the armrest structure for door trim according to the first or second aspects, the strap portion is capable of elastic deformation.

According to the above-described structure, as a result of the strap portion elastic deformation, during an assembly operation the anchor portion can be easily inserted through the attachment hole.

The armrest structure for door trim according to a fourth aspect of the present invention is characterized in that, in the armrest structure for door trim according to any one of the first through third aspects, in the assembled state, the strap portion has a bent portion that is bent in a direction of the narrower portion of the attachment hole.

According to the above-described structure, the strap portion has a bent portion that, once the armrest upper has been mounted onto the armrest lower, is bent in the direction of the narrower portion of the attachment hole. Because of this, once the armrest upper has been mounted onto the armrest lower, the anchor portion is located in a position underneath the narrower portion of the attachment hole. As a result, in the event of a vehicle side impact or the like, if the armrest upper comes away from the armrest lower, then the anchor portion is held back by the peripheral rim portion of the narrower portion of the attachment hole, and the armrest upper is maintained in a state of being joined to the armrest lower.

The armrest structure for door trim according to a fifth aspect of the present invention is characterized in that, in the armrest structure for door trim according to the first aspect, the attachment hole is shaped as an elongated hole having a long side that is formed by the wider portion and a short side that is formed by the narrower portion, and during the process to assemble the armrest upper and the armrest lower together, the strap portion is deformed by being twisted such that the anchor portion passes through the attachment hole while extending in parallel with the long side, and once the armrest upper and the armrest lower are in the assembled state, the anchor portion and the long side assume intersecting positions.

According to the above-described structure, during the process to assemble the armrest upper and the armrest lower together, the strap portion is deformed by being twisted so that the anchor portion passes through the attachment hole in parallel with the long side of the elongated attachment hole. In contrast, once the armrest upper and the armrest lower are in an assembled state, the anchor portion and the long side assume intersecting positions. Because of this, if the armrest upper comes away from the armrest lower, the anchor portion, which is positioned such that it intersects with the long side, is held back by the peripheral rim portion of the attachment hole, and the armrest upper is maintained in a state of being joined to the armrest lower.

The armrest structure for door trim according to a sixth aspect of the present invention is characterized in that, in the armrest structure for door trim according to the first aspect, the attachment hole is shaped as an elongated hole having a long side that is formed by the wider portion and a short side that is formed by the narrower portion, and during the process to assemble the armrest upper and the armrest lower together, the armrest upper is rotated relative to the armrest lower such that the anchor portion passes through the attachment hole while extending in parallel with the long side, and once the armrest upper and the armrest lower are in the assembled state, the anchor portion and the long side assume intersecting positions.

According to the above-described structure, during the process to assemble the armrest upper and the armrest lower together, by rotating the armrest upper relative to the armrest lower, the anchor portion passes through the attachment hole in parallel with the long side of the elongated attachment hole. In contrast, once the armrest upper and the armrest lower are in an assembled state, the anchor portion and the long side assume intersecting positions. Because of this, if the armrest upper comes away from the armrest lower, the anchor portion, which is in a position where it intersects with the long side, is held back by the peripheral rim portion of the attachment hole, and the armrest upper is maintained in a state of being joined to the armrest lower.

The armrest structure for door trim according to a seventh aspect of the present invention is characterized in that, in the armrest structure for door trim according to any one of the first through sixth aspects, the joining component has a fixing portion that is formed at the one end portion of the strap portion, and that is fixed to the one of the armrest upper or the armrest lower.

According to the above-described structure, by fixing the fixing portion that is formed at one end portion of the strap portion of the joining component to one of the armrest upper or the armrest lower, the fixing portion can be fixed to one of the armrest upper or the armrest lower. Because of this, by inserting the anchor portion of the joining component through the attachment hole that is formed in the other one of the armrest upper or the armrest lower, the armrest upper and the armrest lower can be joined together by the joining component.

The armrest structure for door trim according to an eighth aspect of the present invention is characterized in that, in the armrest structure for door trim according to any one of the first through sixth aspects, in the joining component, the one end portion of the strap portion is formed integrally with the one of the armrest upper or the armrest lower.

According to the above-described structure, because one end portion of the strap portion of the joining component is formed integrally with one of the armrest upper or the armrest lower, by inserting the anchor portion of the joining component through the attachment hole that is formed in the other one of the armrest upper or the armrest lower, the armrest upper and the armrest lower can be joined together by the joining component.

Advantageous Effects of the Invention

As has been described above, according to the present invention, it is possible to prevent an armrest upper that has come away from an armrest lower from falling inside a vehicle cabin, and to also provide improved assembling workability.

DESCRIPTION OF EMBODIMENTS (First Embodiment)

Figure 1:
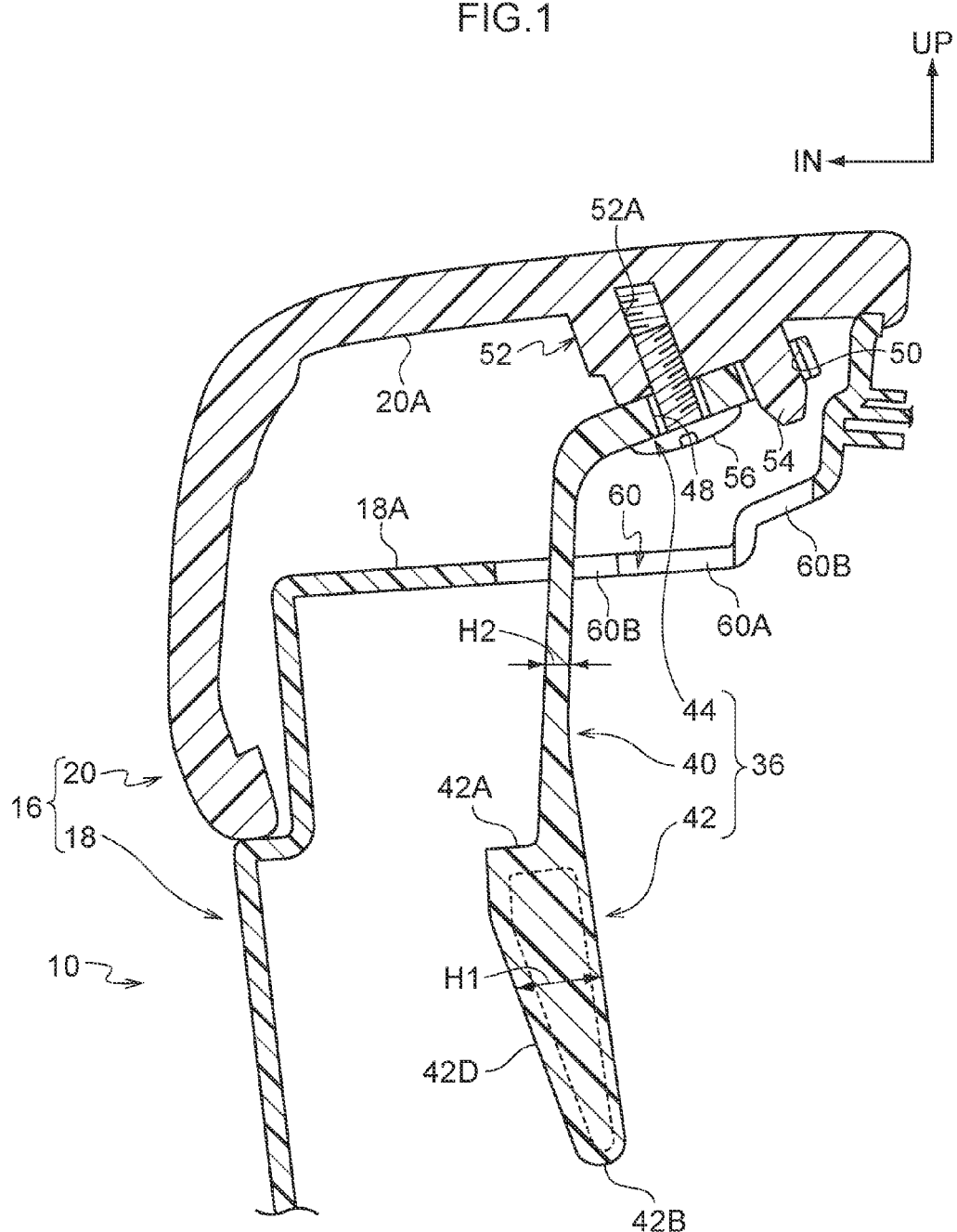
FIG. 1 is an enlarged cross-sectional view taken along a cross-sectional line 1-1 shown in FIG. 8.

A first embodiment of an armrest structure for door trim according to embodiments of the present invention will now be described in accordance with FIG. 1 through FIG. 8. Note that an arrow FR that is shown where appropriate in the drawings indicates a forward side of a door to which the armrest structure for door trim of the present embodiment has been applied, while an arrow UP indicates an upward direction, and an arrow IN indicates a direction towards the interior of a vehicle cabin. Moreover, the armrest structure for door trim described below is applied, as an example, to a front door that is installed on the right-side portion of a vehicle (i.e., an automobile).

Figure 8:
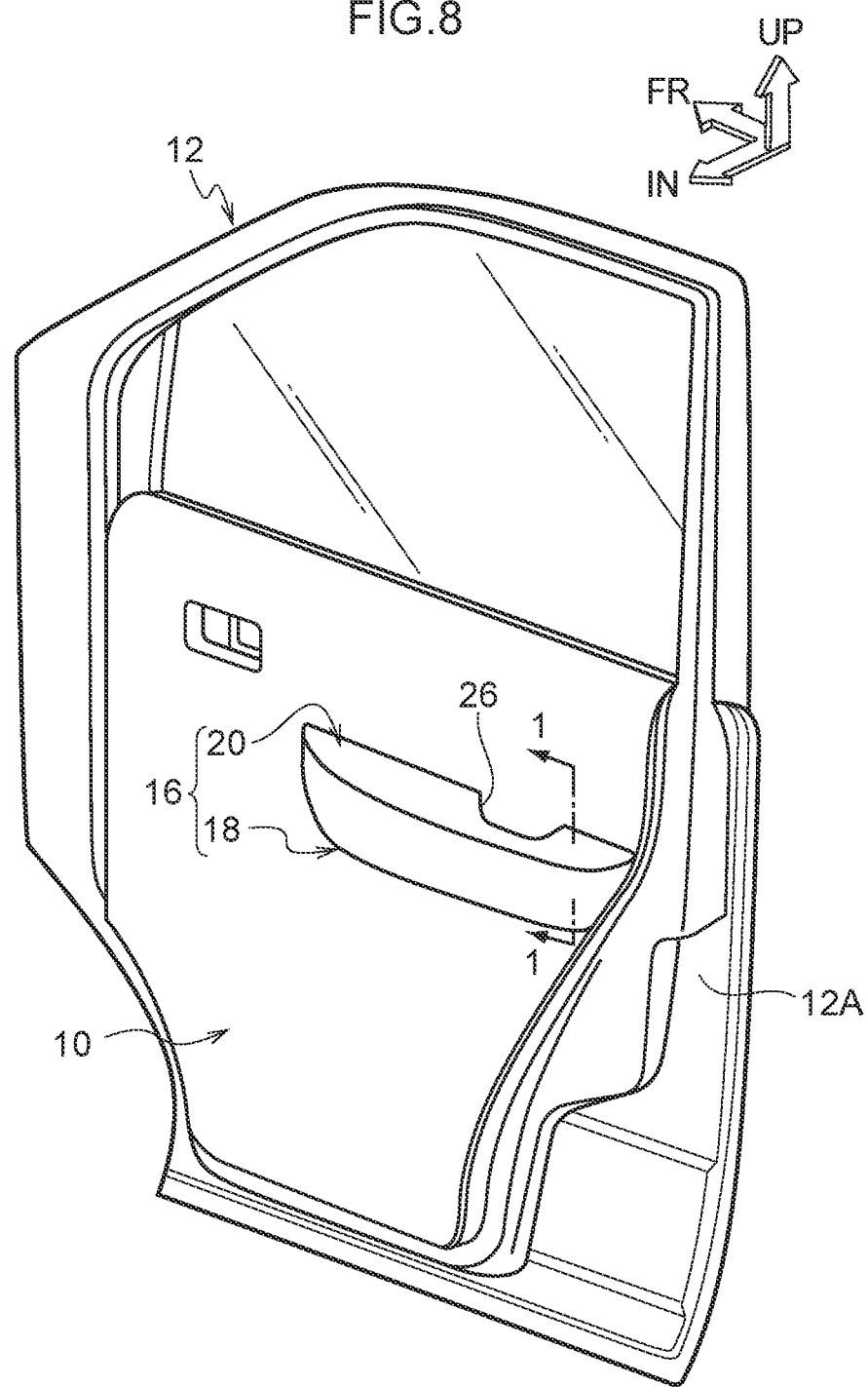
FIG. 8 is a perspective view as seen from a vehicle cabin inward and upward direction showing a vehicle door to which the armrest structure for door trim according to the first embodiment of the present invention has been applied.

As is shown in FIG. 8, in the present embodiment, a door trim 10 forms a vehicle cabin interior side of a front side door 12, and the door trim 10 is installed on an inner panel 12A of the front side door 12.

An armrest portion 16 is provided in a substantially central portion of the door trim 10. This armrest portion 16 protrudes towards the interior side of the vehicle cabin. The armrest portion 16 is provided with an armrest lower 18 that is formed integrally with the door trim 10, and with an armrest upper 20 that is attached to a top portion of the armrest lower 18.

Figure 7:
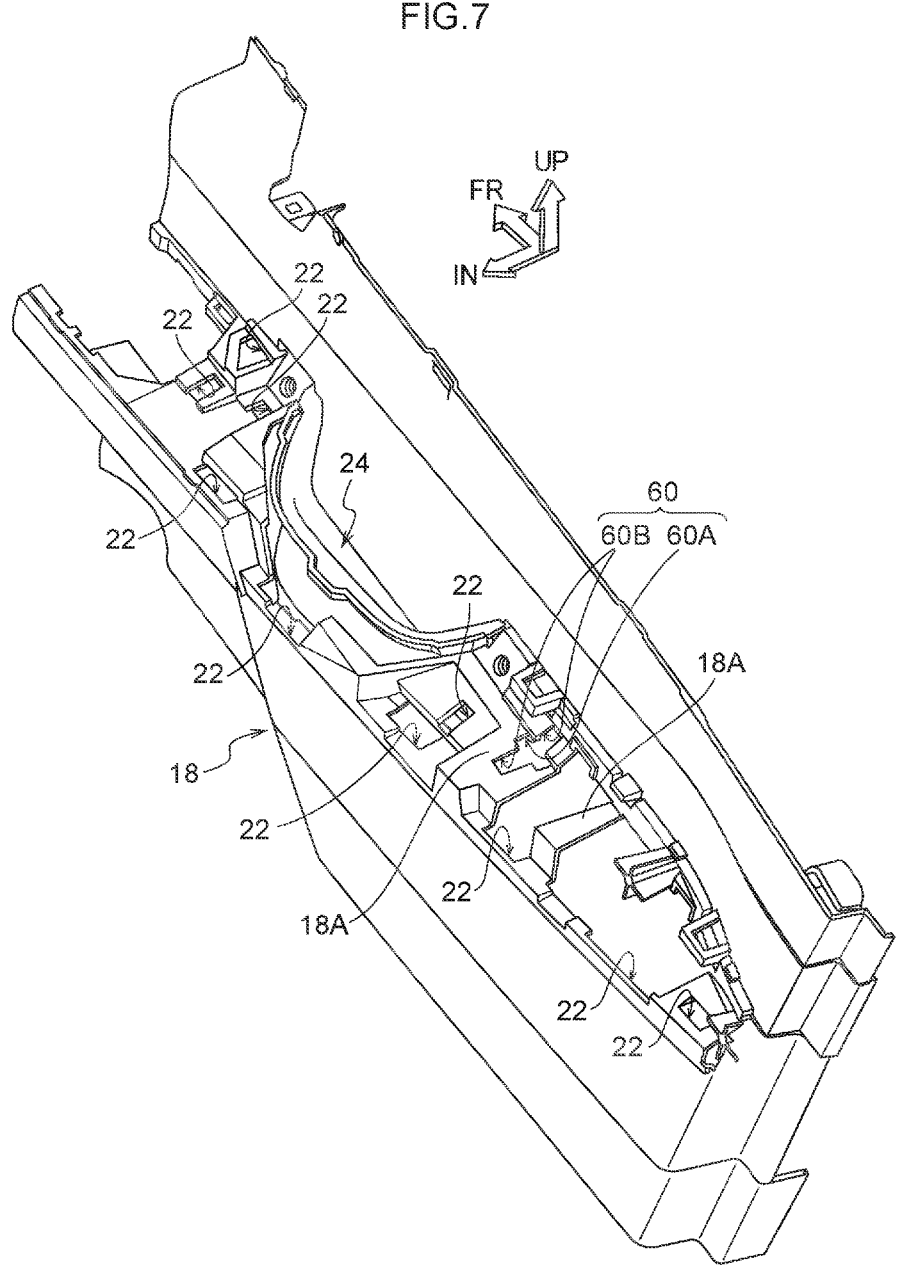
FIG. 7 is a perspective view as seen from a vehicle cabin inward and upward direction showing an armrest lower of the armrest structure for door trim according to the first embodiment of the present invention.

As is shown in FIG. 7, a pull handle recessed portion 24, and a plurality of mounting holes 22 that are used for attaching the armrest upper 20 are formed in a top surface 18A of the armrest lower 18.

Figure 6:
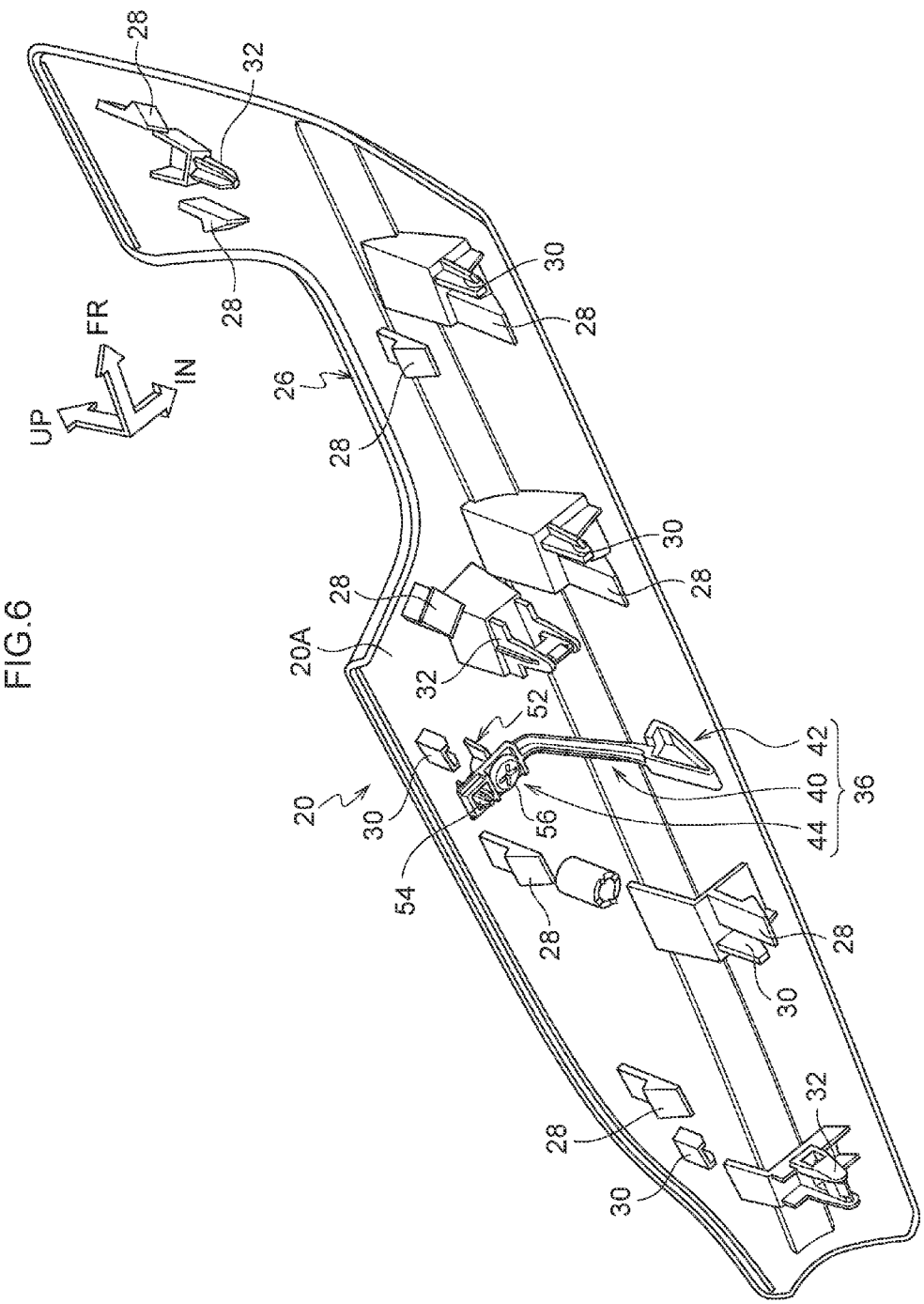
FIG. 6 is a perspective view as seen from a vehicle cabin outward and downward direction showing an armrest upper of the armrest structure for door trim according to the first embodiment of the present invention.

As is shown in FIG. 6, a pull handle aperture portion 26 is formed in the armrest upper 20, and this pull handle aperture portion 26 is superimposed on the pull handle recessed portion 24 of the armrest lower 18. A plurality of engaging claws 28, positioning projections 30, and guides 32 that are used for attaching the armrest upper 20 to the armrest lower 18 are formed protruding from the bottom surface 20A of the armrest upper 20. By inserting these engaging claws 28, positioning projections 30, and guides 32 into the mounting holes 22 in the armrest lower 18 (see FIG. 7), the armrest upper 20 can be attached to the top portion of the armrest lower 18. Note that in the event of a side impact or the like, if a load of a predetermined size or greater acts from the vehicle cabin interior side on the armrest portion 16, then the armrest upper 20 comes away from the armrest lower 18.

Figure 3:
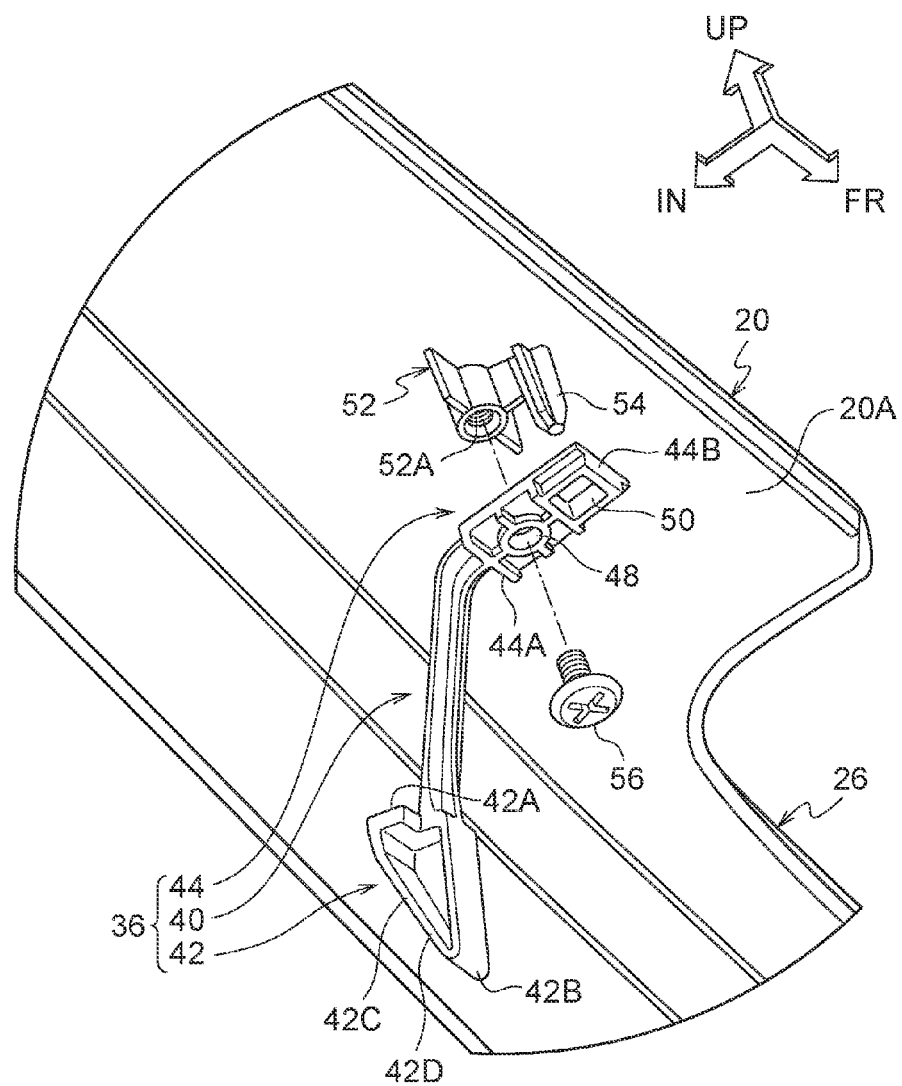
FIG. 3 is a perspective view as seen from a vehicle cabin outward and downward direction showing a method of fixing the joining component of the armrest structure for door trim according to the first embodiment of the present invention.

As is shown in FIG. 3, a clip 36 that serves as a joining component is attached to the bottom surface 20A of the armrest upper 20. This clip 36 is provided with a belt-shaped strap portion 40 having a rectangular cross-section, and this strap portion 40 is able to undergo elastic deformation. In addition, an anchor portion 42 is formed at one end portion (i.e., at the bottom end portion) in the longitudinal direction of the strap portion 40, and a fixing portion 44 is formed at the other end portion (i.e., at the top end portion) in the longitudinal direction of the strap portion 40. The fixing portion 44 extends from the top end of the strip portion 40 in the direction of the exterior side of the vehicle cabin.

Figure 2:
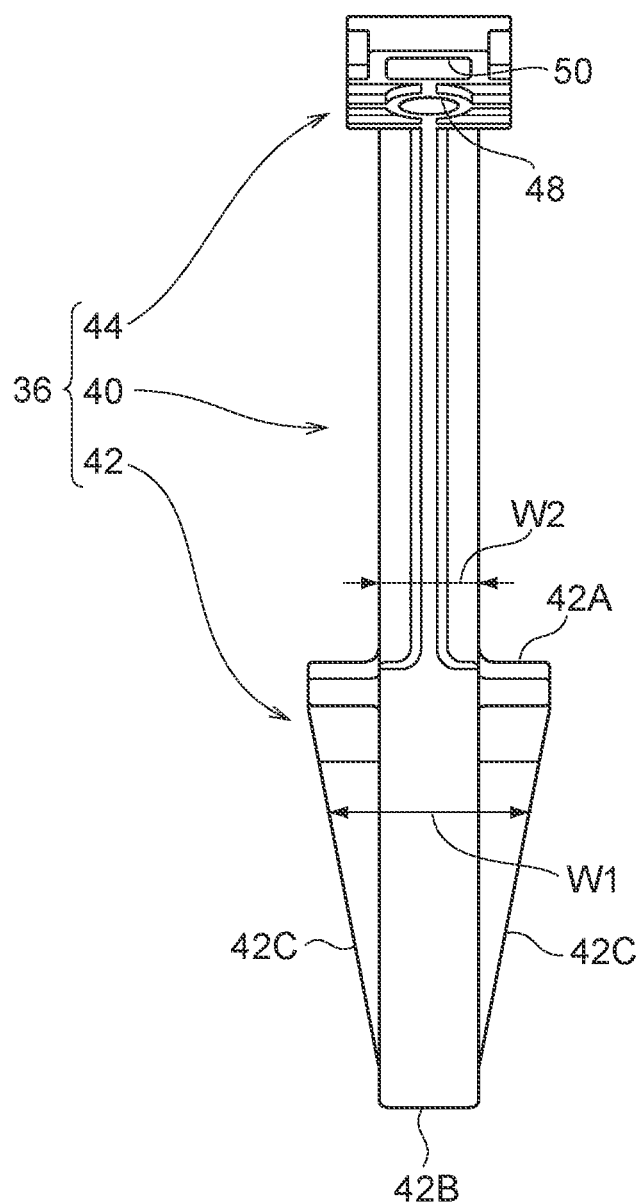
FIG. 2 is a plan view as seen from a vehicle cabin outward side showing a joining component of an armrest structure for door trim according to a first embodiment of the present invention.

As is shown in FIG. 2, the anchor portion 42 of the clip 36 becomes gradually narrower as it moves towards the distal end thereof. Specifically, a width W1 of the anchor portion 42 becomes gradually narrower as it moves from a base 42A, which is joined to the strap portion 40, towards a distal end 42B such that both side surfaces 42C are inclined surfaces. Note that the width of the distal end 42B is substantially equivalent to a width W2 of the strap portion 40.

As is shown in FIG. 1, a height H1 of the anchor portion 42 becomes gradually lower as it moves from the base 42A towards the distal end 42B so that a vehicle cabin interior side surface 42D is an inclined surface. Note that the height of the base 42A is greater than a height H2 of the strap portion 40.

As is shown in FIG. 3, the width of the fixing portion 44 remains constant from a base 44A, which is joined to the strap portion 40, to a distal end 44B. A substantially circular attachment hole 48 is formed in the fixing portion 44 adjacent to the base 44A, and a substantially rectangular locking hole 50 is formed in the fixing portion 44 adjacent to the distal end 44B. In contrast, a fixing projection 52 and a locking projection 54 are formed protruding downwards on the bottom surface 20A of the armrest upper 20. A threaded hole 52A is formed in the fixing projection 52. By screwing a fixing component in the form of a screw 56 that has been fitted inside the attachment hole 48 in the fixing portion 44 into this threaded hole 52A, the clip 36 can be attached to the armrest upper 20. Moreover, by inserting the locking projection 54 into the locking hole 50 in the fixing portion 44, the clip 36 can be fixed in position relative to the armrest upper 20.

Figure 5:
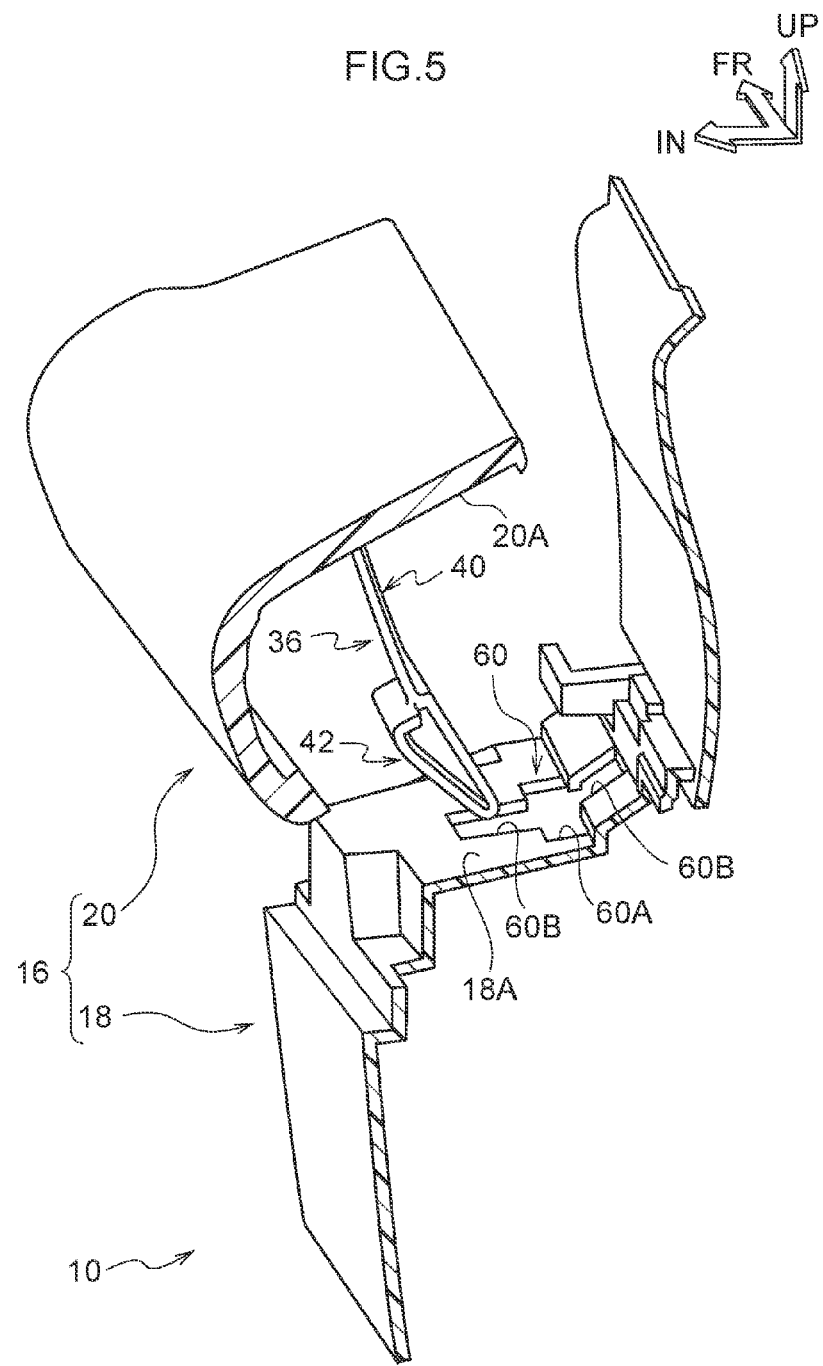
FIG. 5 is a perspective view as seen from a vehicle cabin inward and upward direction showing a method of assembling the armrest structure for door trim according to the first embodiment of the present invention.

As is shown in FIG. 5, an attachment hole 60 that is used to insert the strap portion 40 of the clip 36 is formed in the top surface 18A of the armrest lower 18. This attachment hole 60 has a wider portion 60A and narrower portions 60B. The longitudinal direction of this attachment hole 60 extends in the vehicle cabin transverse direction, and the wider portion 60A is formed in a central portion in this longitudinal direction, while the narrower portions 60B are formed at both end portions in this longitudinal direction. Because the anchor portion 42 of the clip 36 has a larger width than the narrower portions 60B of the attachment hole 60, and a smaller width than the wider portion 60A of the attachment hole 60, the anchor portion 42 is able to pass through the wider portion 60A of the attachment hole 60, but is not able to pass through the narrower portions 60B thereof.

As is shown in FIG. 5, when the armrest upper 20 is being mounted onto the armrest lower 18, the anchor portion 42 of the clip 36 that has been fixed to the armrest upper 20 is able to pass through the wider portion 60A of the attachment hole 60 that is formed in the armrest lower 18. Because of this, by inserting the anchor portion 42 of the clip 36 through the wider portion 60A of the attachment hole 60, the armrest upper 20 and the armrest lower 18 can be joined together by means of the clip 36.

As is shown in FIG. 1, in an assembled state in which the armrest upper 20 has been mounted onto the armrest lower 18, the strap portion 40 that is formed in the clip 36 is inserted through the narrower portion 60B of the attachment hole 60. Moreover, the anchor portion 42 of the clip 36 is located underneath the narrower portion 60B of the attachment hole 60 so that the anchor portion 42 is unable to pass upwards through the attachment hole 60 from underneath the attachment hole 60.

Figure 4:
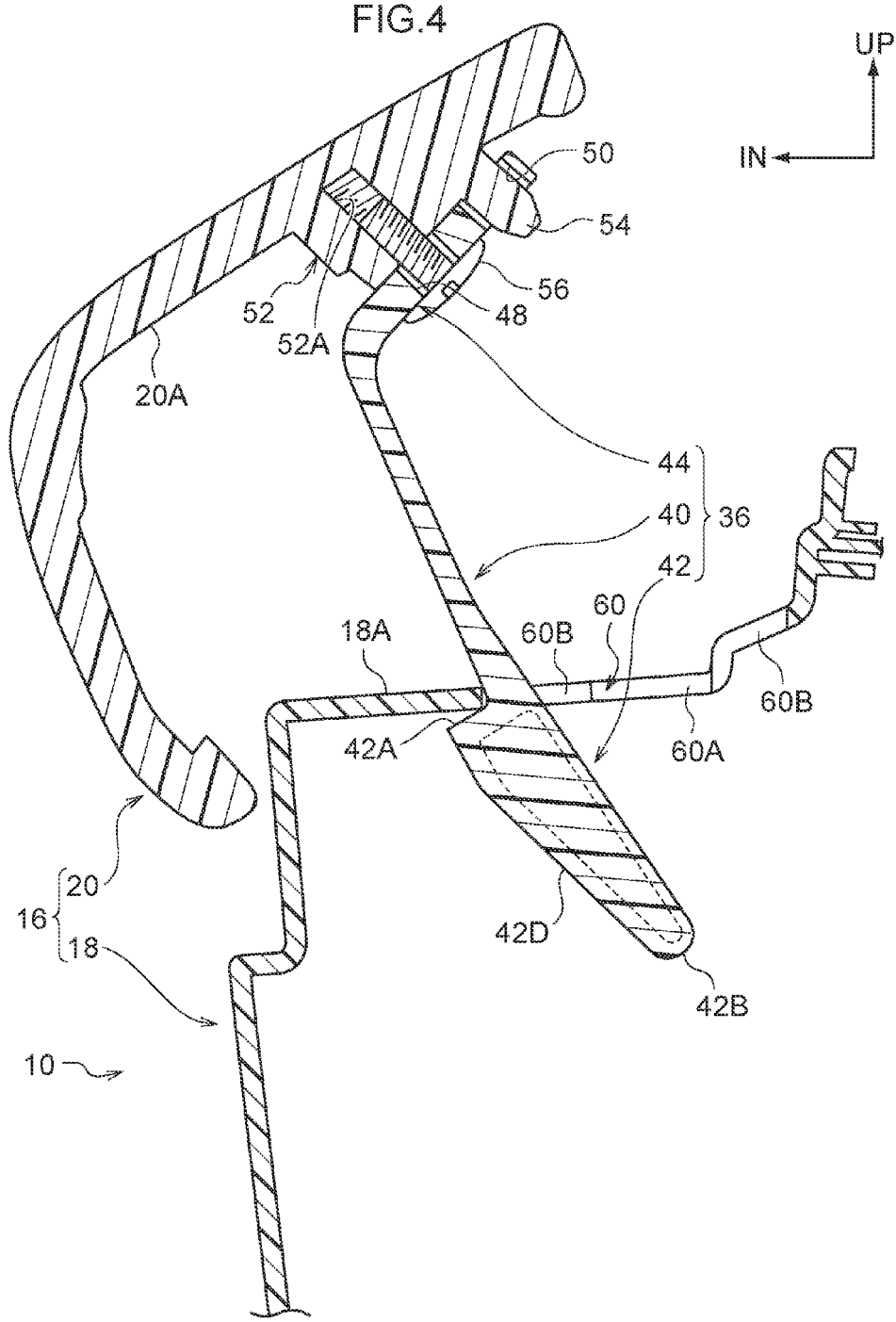
FIG. 4 is a cross-sectional view corresponding to FIG. 1 showing an engaged state of the joining component of the armrest structure for door trim according to the first embodiment of the present invention.

Because of this, in the event of a vehicle side impact or the like, the armrest portion 16 of the door trim 10 is crushed by a compression load coming from the vehicle transverse direction and, as is shown in FIG. 4, if the armrest upper 20 comes away from the armrest lower 18, then the anchor portion 42 of the clip 36 is held back by the peripheral rim portion of the narrower portion 60B of the attachment hole 60. Because of this, the armrest upper 20 is maintained in a state of being joined to the armrest lower 18.

(Operation and Effects)

As is shown in FIG. 5, in the present embodiment, when the armrest upper 20 is being mounted onto the armrest lower 18, the anchor portion 42 of the clip 36 which is fixed to the armrest upper 20 is able to pass through the wider portion 60A of the attachment hole 60 that is formed in the armrest lower 18. Because of this, by inserting the anchor portion 42 of the clip 36 through the wider portion 60A of the attachment hole 60, the armrest upper 20 and the armrest lower 18 can be easily joined together by means of the clip 36. Thereafter, the armrest lower 18 is attached to the armrest upper 20. As a result, the assembling workability can be improved.

In the present embodiment, the width W1 of the anchor portion 42 of the clip 36 becomes gradually narrower as it moves from the base 42A towards the distal end 42B so that the two side surfaces 42C are formed as inclined surfaces. Moreover, the height H1 of the anchor portion 42 becomes gradually smaller as it moves from the base 42A towards the distal end 42B so that the vehicle cabin interior side surface 42D is an inclined surface. Because of this, the anchor portion 42 can easily be inserted into the wider portion 60A of the attachment hole 60.

In the present embodiment, because the strap portion 40 of the clip 36 is capable of elastic deformation, by causing the strap portion 40 to undergo elastic deformation, the anchor portion 42 can easily be inserted into the wider portion 60A of the attachment hole 60.

As is shown in FIG. 1, in an assembled state in which the armrest upper 20 has been mounted onto the armrest lower 18, the strap portion 40 of the clip 36 is inserted through the narrower portion 60B of the attachment hole 60, and the anchor portion 42 is located underneath the narrower portion 60B of the attachment hole 60 so that the anchor portion 42 is in a position where it is unable to pass through the attachment hole 60.

Because of this, in the event of a vehicle side impact or the like, the armrest portion 16 of the door trim 10 is crushed by a load coming from the direction of the vehicle cabin interior and, as is shown in FIG. 4, if the armrest upper 20 comes away from the armrest lower 18, then the anchor portion 42 of the clip 36 is held back by the peripheral rim portion of the narrower portion 60B of the attachment hole 60. Because of this, the armrest upper 20 is kept in a state in which it remains joined to the armrest lower 18. As a result, the armrest upper 20 can be prevented from falling inside the vehicle cabin. Moreover, as a result of the armrest upper 20 coming away from the armrest lower 18, the armrest lower 18 is reliably crushed by the impact load, and the vehicle occupant is thereby reliably protected.

(Second Embodiment)

Next, a second embodiment of the armrest structure for door trim according to embodiments of the present invention will be described in accordance with FIG. 9 through FIG. 12. Note that component elements that are the same as in the first embodiment are given the same descriptive symbols and any description thereof is omitted.

Figure 9:
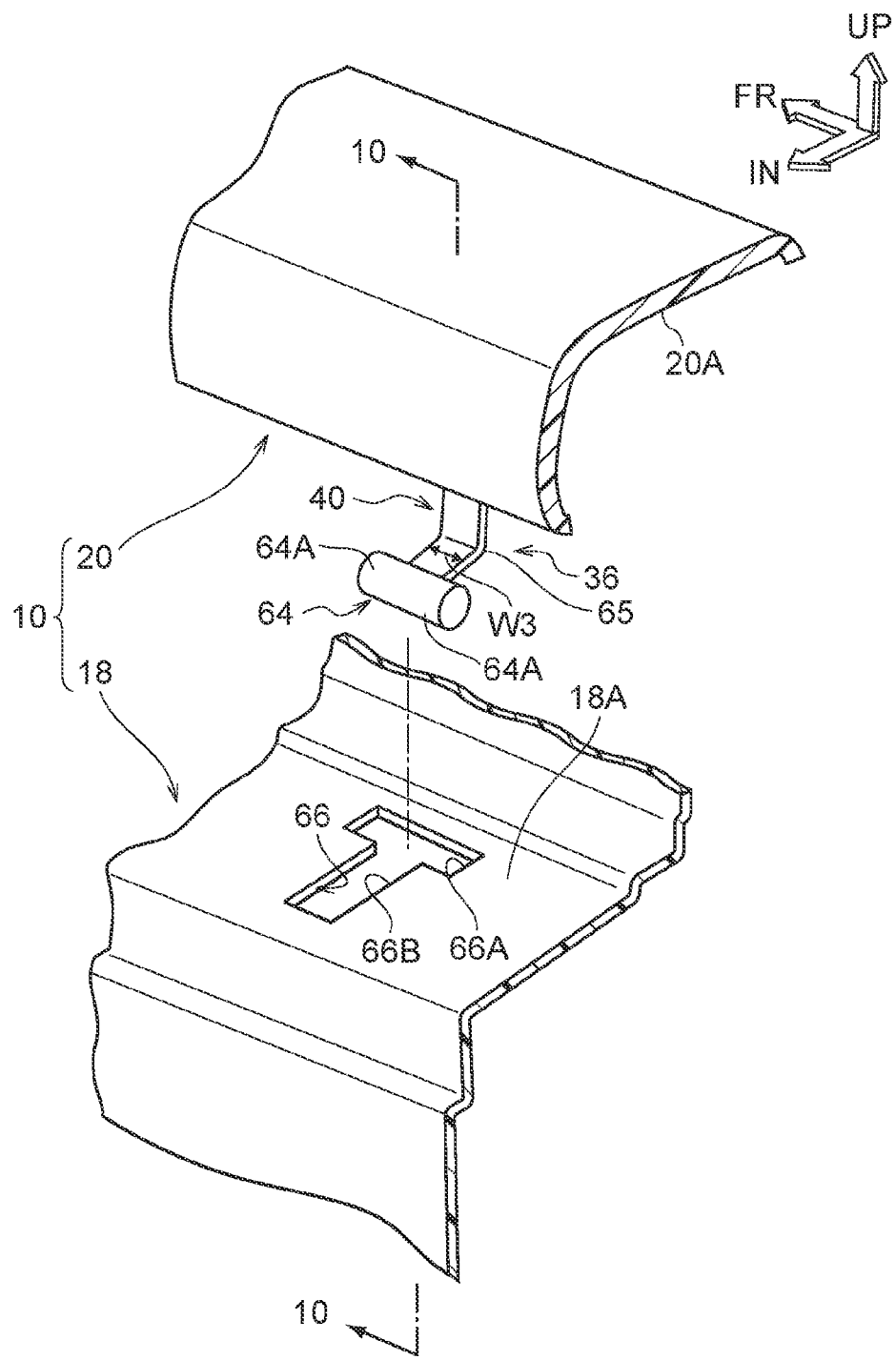
FIG. 9 is an exploded perspective view as seen from a vehicle cabin inward and upward direction showing an armrest structure for door trim according to a second embodiment of the present invention.

As is shown in FIG. 9, in the present embodiment, an anchor portion 64 of the clip 36 is a circular column-shaped component whose axial direction extends in the transverse direction of the strap portion 40 (i.e., in the direction shown by an arrow W3 in FIG. 9). Both end portions 64A of the anchor portion 64 protrude towards the outer sides in the transverse direction of the strap portion 40.

Figure 11:
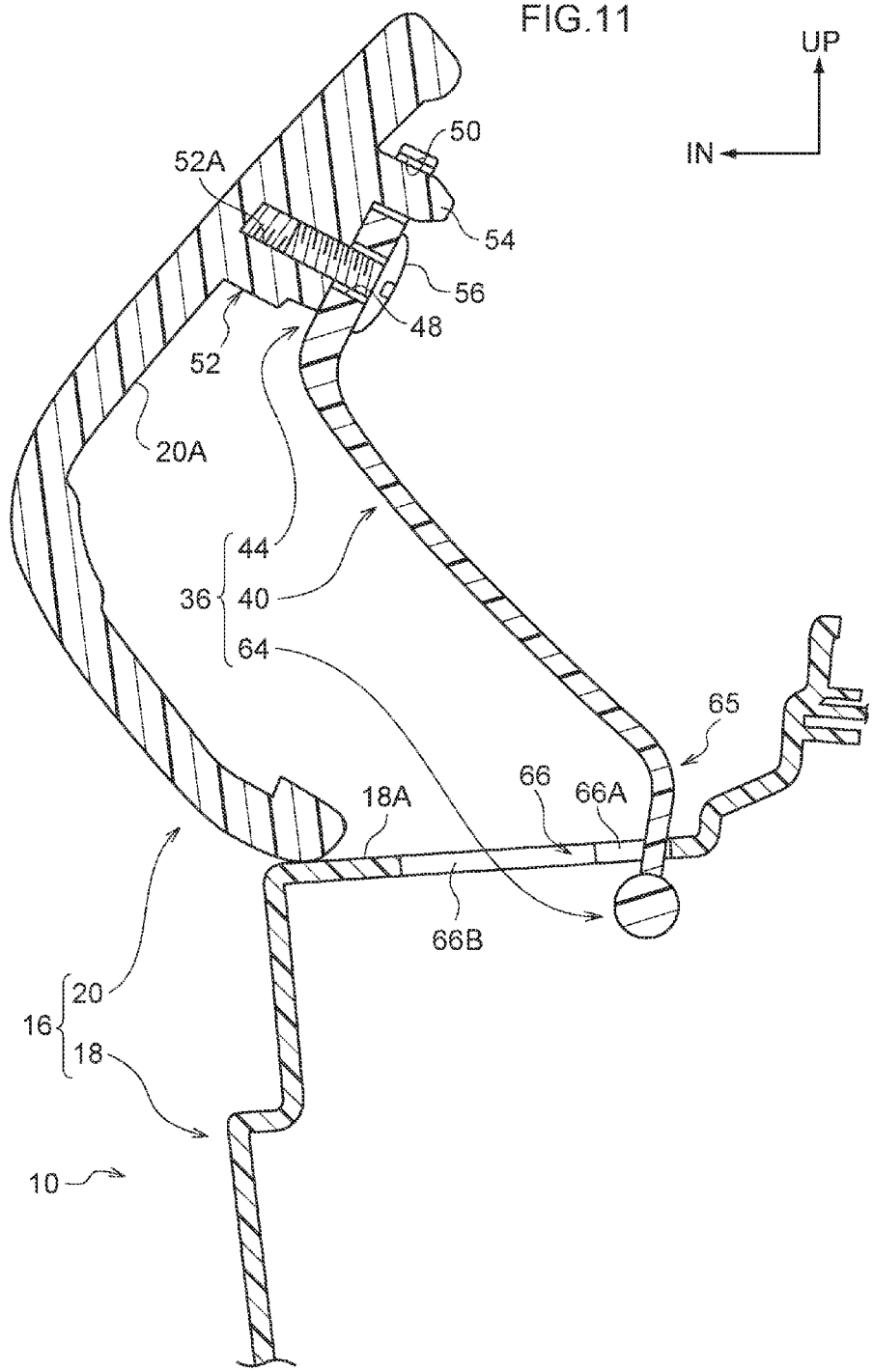
FIG. 11 is a cross-sectional view corresponding to FIG. 10 showing a method of assembling a joining component of the armrest structure for door trim according to the second embodiment of the present invention.

An attachment hole 66 that is formed in the top surface 18A of the armrest lower 18 has a wider portion 66A and a narrower portion 66B, and a longitudinal direction of the attachment hole 66 extends in the vehicle cabin transverse direction. The wider portion 66A is formed at an end portion on the vehicle cabin exterior side in the longitudinal direction of the attachment hole 66, while the vehicle cabin interior side portion in the longitudinal direction of the attachment hole 66 is formed as the narrower portion 66B. As is shown in FIG. 11, the anchor portion 64 of the clip 36 is able to pass through the wider portion 66A of the attachment hole 66. In contrast, the anchor portion 64 of the clip 36 is unable to pass through the narrower portion 64B of the attachment hole 66.

Figure 10:
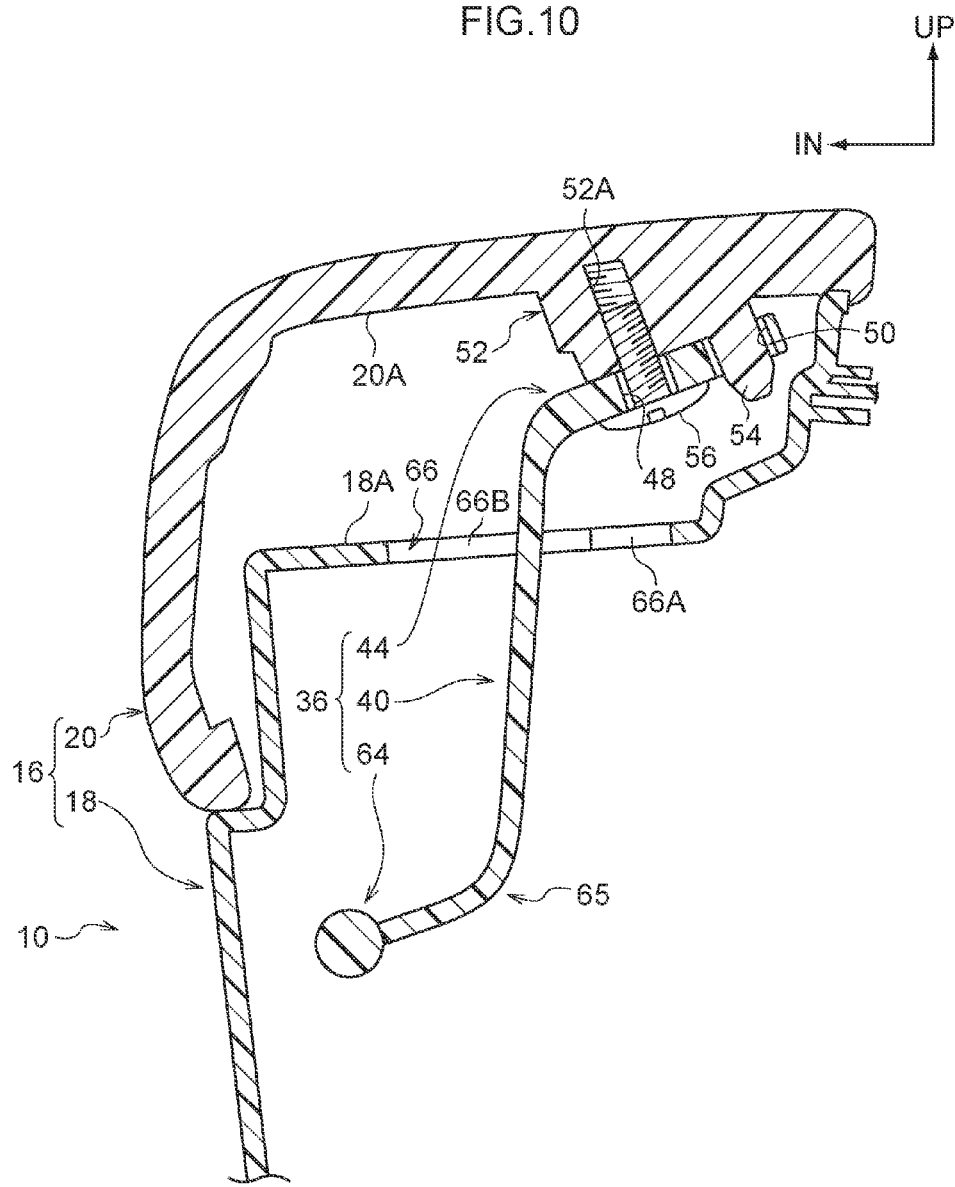
FIG. 10 is a cross-sectional view taken along a cross-sectional line 10-10 shown in FIG. 9 showing an attachment state of the armrest structure for door trim according to the second embodiment of the present invention.
Figure 12:
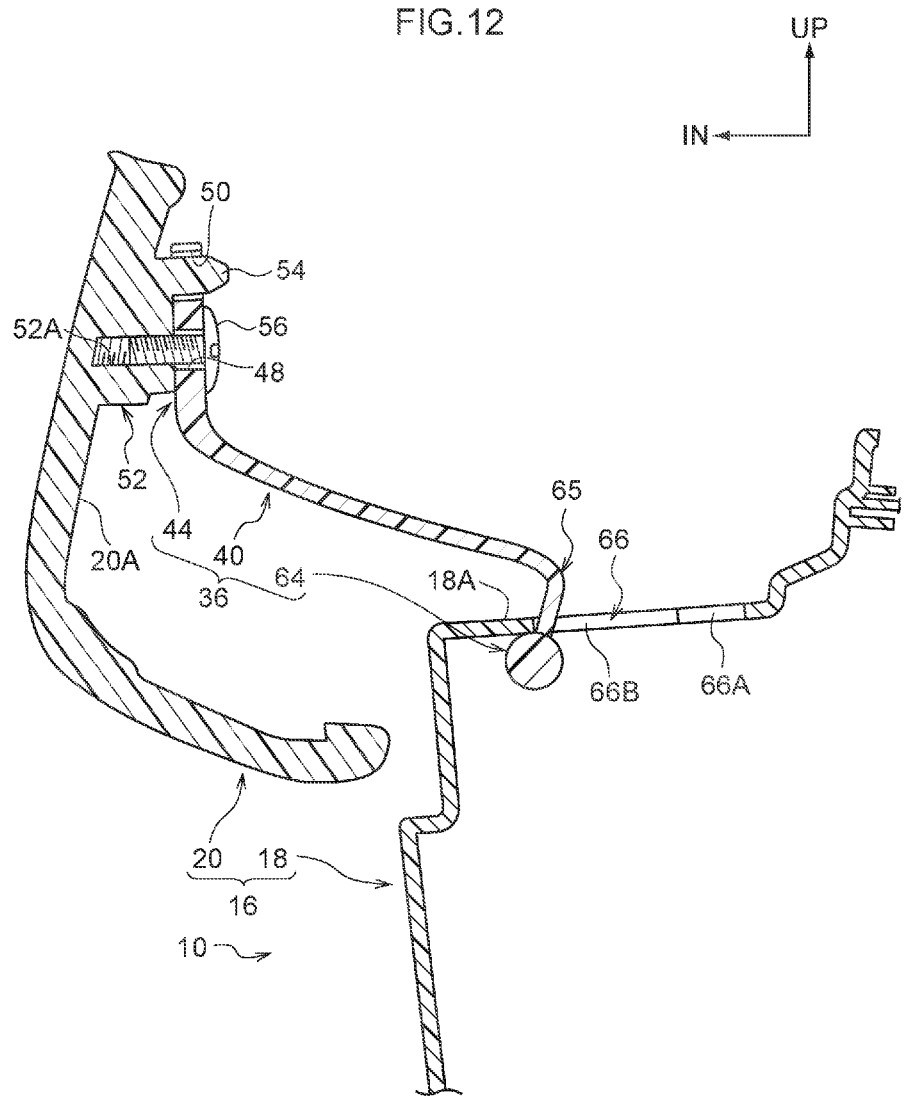
FIG. 12 is a cross-sectional view corresponding to FIG. 10 showing an engaged state of the joining component of the armrest structure for door trim according to the second embodiment of the present invention.

As is shown in FIG. 10, a bent portion 65 is formed in the vicinity of the anchor portion 64 of the strap portion 40. The bent portion 65 is bent such that, when the armrest upper 20 has been mounted onto the armrest lower 18, the bent portion 65 extends towards the narrower portion 66B of the attachment hole 66 in parallel with the bottom surface 20A of the armrest upper 20. Because of this, when the armrest upper 20 has been mounted onto the armrest lower 18, the anchor portion 64 is located underneath the narrower portion 66B of the attachment hole 66. As a result, as is shown in FIG. 12, in the event of a vehicle side impact, if the armrest upper 20 comes away from the armrest lower 18, the anchor portion 64 is held back by the peripheral rim portion of the narrower portion 66B of the attachment hole 66, and the armrest upper 20 is maintained in a state of being joined to the armrest lower 18 by the clip 36.

Accordingly, in the present embodiment as well, in the same way as in the first embodiment, an armrest upper 20 that has come away from the armrest lower 18 of the door trim 10 can be prevented by the clip 36 from falling into the vehicle cabin, and the assembling workability when the armrest upper 20 is being mounted onto the armrest lower 18 can be improved.

(Third Embodiment)

Next, a third embodiment of the armrest structure for door trim according to embodiments of the present invention will be described in accordance with FIG. 13. Note that component elements that are the same as in the first embodiment are given the same descriptive symbols and any description thereof is omitted.

Figure 13:
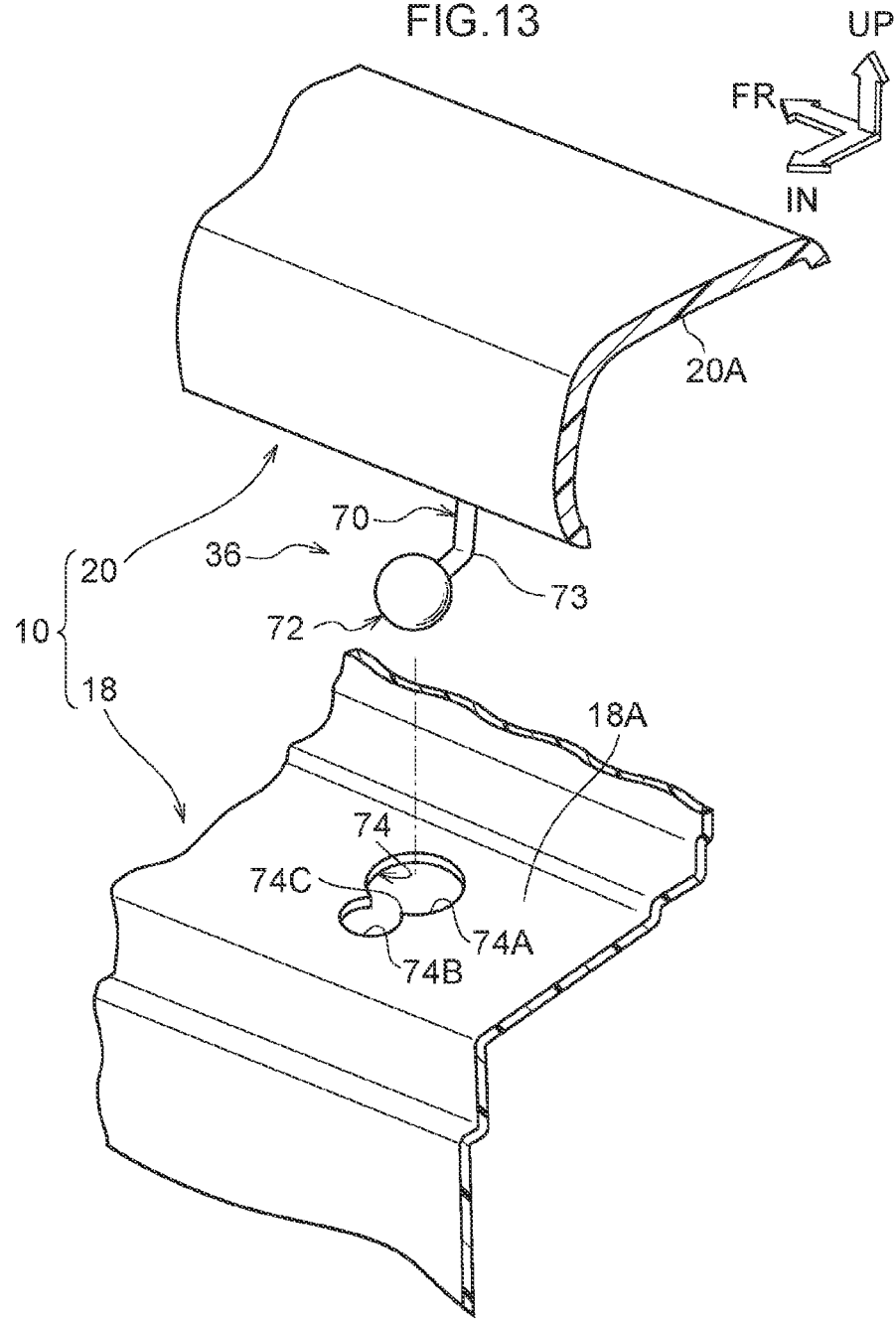
FIG. 13 is an exploded perspective view as seen from a vehicle cabin inward and upward direction showing an armrest structure for door trim according to a third embodiment of the present invention.

As is shown in FIG. 13, in the present embodiment, a strap portion 70 of the clip 36 is formed in a cord shape having a circular cross-section, and an anchor portion 72 is formed in a spherical shape that is larger than the shaft diameter of the strap portion 70.

An attachment hole 74 that is formed in the top surface 18A of the armrest lower 18 has a circular wider portion 74A, and a circular narrower portion 74B that is smaller than the wider portion 74A. The anchor portion 72 of the clip 36 is able to pass through the wider portion 74A of the attachment hole 74, but is not able to pass through the narrower portion 74B thereof.

A bent portion 73 is formed in the vicinity of the anchor portion 72 of the strap portion 70. The bent portion 73 is bent such that, when the armrest upper 20 has been mounted onto the armrest lower 18, the bent portion 73 extends towards the narrower portion 74B of the attachment hole 74 in parallel with the bottom surface 20A of the armrest upper 20. Because of this, when the armrest upper 20 has been mounted onto the armrest lower 18, the anchor portion 72 is located underneath the narrower portion 74B of the attachment hole 74. As a result, in the event of a vehicle side impact, if the armrest upper 20 comes away from the armrest lower 18, the anchor portion 72 is held back by the peripheral rim portion of the narrower portion 74B of the attachment hole 74, and the armrest upper 20 is maintained in a state of being joined to the armrest lower 18 by the clip 36. Furthermore, the attachment hole 74 also has a neck portion 74C at the boundary between the wider portion 74A and the narrower portion 74B, and this neck portion 74C is formed slightly narrower than the shaft diameter of the strap portion 70. Accordingly, after the anchor portion 72 of the clip 36 has been inserted through the wider portion 74A of the attachment hole 74, if the strap portion 70 is then moved from the wider portion 74A to the narrower portion 74B, then the strap portion 70 can be prevented from returning to the wider portion 74A.

Accordingly, in the present embodiment as well, in the same way as in the first embodiment, an armrest upper 20 that has come away from the armrest lower 18 of the door trim 10 can be prevented from falling into the vehicle cabin, and the assembling workability when the armrest lower 18 is being mounted onto the armrest upper 20 can be improved.

(Fourth Embodiment)

Next, a fourth embodiment of the armrest structure for door trim according to embodiments of the present invention will be described in accordance with FIG. 14. Note that component elements that are the same as in the first embodiment are given the same descriptive symbols and any description thereof is omitted.

Figure 14:
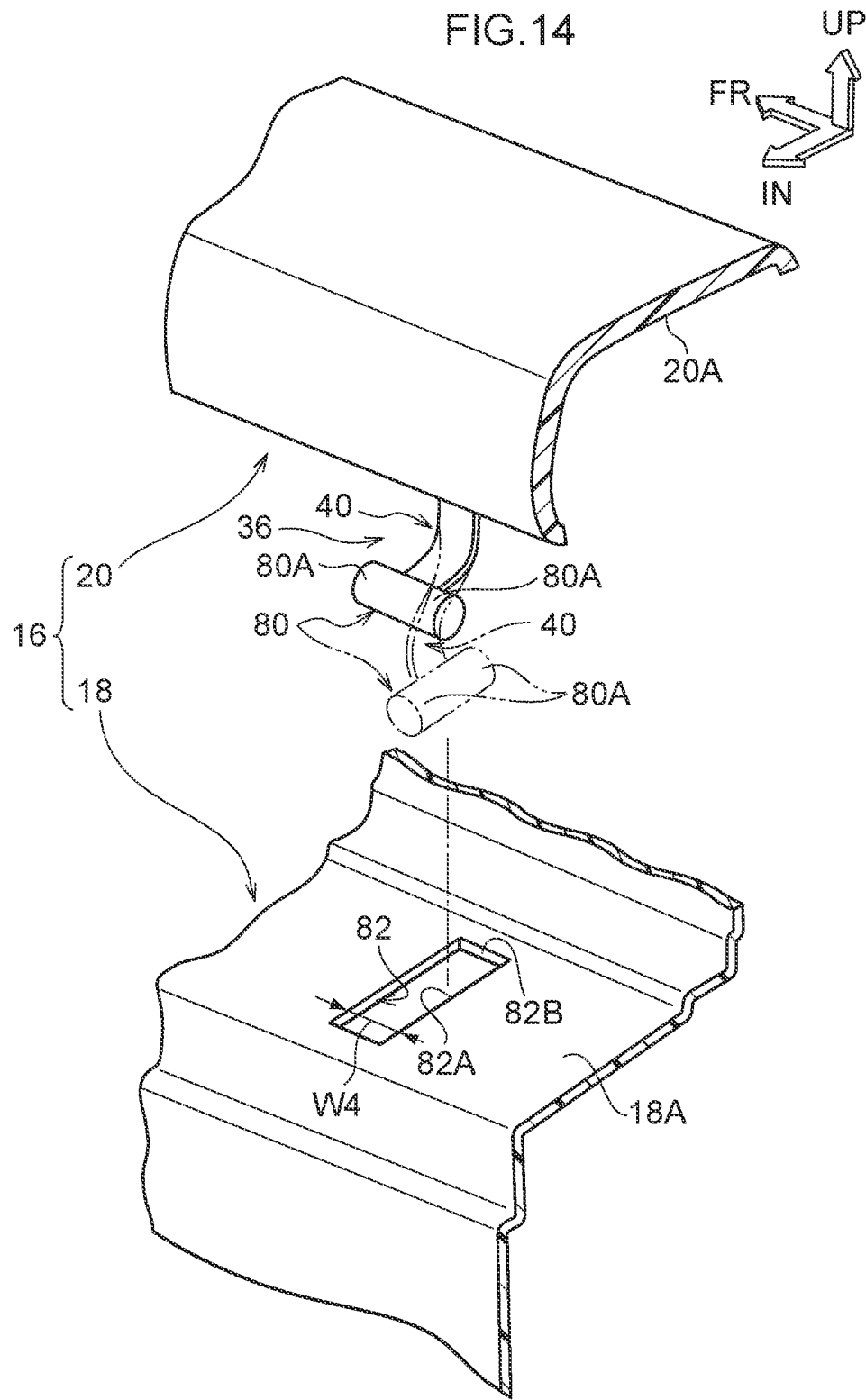
FIG. 14 is an exploded perspective view as seen from a vehicle cabin inward and upward direction showing an armrest structure for door trim according to a fourth embodiment of the present invention.

As is shown in FIG. 14, in the present embodiment, an anchor portion 80 of the clip 36 is formed in a circular column shape whose axial direction extends in the transverse direction of the strap portion 40. Both end portions 80A of the anchor portion 80 protrude towards the outer sides in the transverse direction of the strap portion 40.

An attachment hole 82 that is formed in the top surface 18A of the armrest lower 18 is formed as an elongated hole having a constant width W4. The attachment hole 82 has a long side 82A that serves as a wider portion and is long enough for the anchor portion 80 to be inserted through it, and a short side 82B that serves as a narrower portion and is not long enough for the anchor portion 80 to be inserted through it.

When the armrest upper 20 is being mounted onto the armrest lower 18, the strap portion 40 is twisted by means of elastic deformation as is shown by the double-dot chain line in FIG. 14. As a consequence, the anchor portion 80 is arranged in an insertion position in which it extends in parallel with the long side 82A of the attachment hole 82, and this enables the anchor portion 80 to be passed through the attachment hole 82. In contrast, once the armrest upper 20 and the armrest lower 18 have been assembled together, the anchor portion 80 is returned to being aligned in a direction in which it intersects with the long side 82A of the attachment hole 82, namely, is returned to being aligned in parallel with the short side 82B so that it is unable to pass through the attachment hole 82.

Accordingly, in the present embodiment as well, in the same way as in the first embodiment, an armrest upper 20 that has come away from the armrest lower 18 of the door trim 10 can be prevented from falling into the vehicle cabin, and the assembling workability when the armrest upper 20 is being mounted onto the armrest lower 18 can be improved.

(Fifth Embodiment)

Next, a fifth embodiment of the armrest structure for door trim according to embodiments of the present invention will be described in accordance with FIG. 15. Note that component elements that are the same as in the fourth embodiment are given the same descriptive symbols and any description thereof is omitted.

Figure 15:
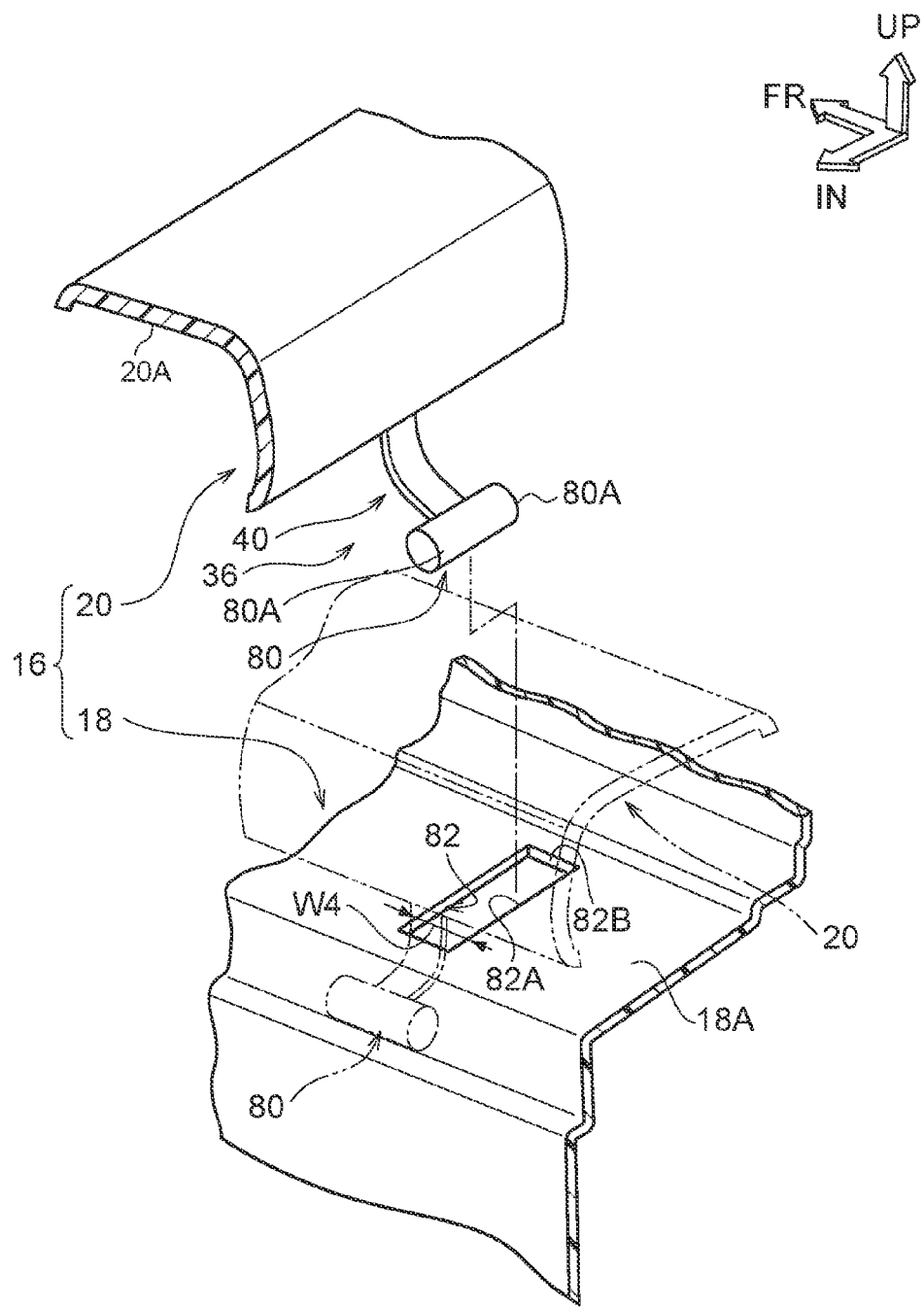
FIG. 15 is an exploded perspective view as seen from a vehicle cabin inward and upward direction showing an armrest structure for door trim according to a second embodiment of the present invention.

As is shown in FIG. 15, in the present embodiment, when the armrest upper 20 is being mounted onto the armrest lower 18, the armrest upper 20 is rotated 90 degrees relative to the armrest lower 18. By doing this, the anchor portion 80 is arranged in an insertion position in which it extends in parallel with the long side 82A of the attachment hole 82, and this enables the anchor portion 80 to be passed through the attachment hole 82. In contrast, once the armrest upper 20 and the armrest lower 18 have been assembled together, the anchor portion 80 is returned to being aligned in a direction in which it intersects with the long side 82A of the attachment hole 82, namely, is returned to being aligned in parallel with the short side 82B so that it is unable to pass through the attachment hole 82.

Accordingly, in the present embodiment as well, in the same way as in the first embodiment, an armrest upper 20 that has come away from the armrest lower 18 of the door trim 10 can be prevented from falling into the vehicle cabin, and the assembling workability when the armrest upper 20 is being mounted onto the armrest lower can be improved.

(Supplementary Description of the Embodiments)

Note that the present invention has been described in detail based on specific embodiments, however, the present invention is not limited to these respective embodiments and the fact that various other embodiments are possible insofar as they do not depart from the spirit or scope of the present invention is evident to one skilled in the art. For example, in the armrest structure for door trim of each of the above-described embodiments, the fixing portion 44 of the clip 36 is fixed to the armrest upper 20, and the attachment hole 60 is formed in the armrest lower 18. Instead of this, it is also possible to employ a structure in which the fixing portion 44 of the clip 36 is fixed to the armrest lower 18, and the attachment hole 60 is formed in the armrest upper 20.

Moreover, in the armrest structure for door trim of each of the above-described embodiments, the clip 36 that serves as a joining component is formed as a separate component from the armrest lower 18 and the armrest upper 20. Instead of this, it is also possible to employ a structure in which one end portion of the strap portion 40 of the clip 36 is formed integrally with either the armrest upper 20 or the armrest lower 18. Namely, it is also possible to employ a structure in which the clip 36 extends out from either the armrest upper 20 or the armrest lower 18. Moreover, as another embodiment, it is also possible to employ crimping as an alternative to screwing in the structure for attaching the clip 36 to the armrest upper 20, or to employ a locking recessed portion as an alternative to the locking hole 50. Furthermore, the armrest lower 18 does not need to be formed integrally with the door trim 10 and may be a separate body.

In addition to these, various other modifications and the like may be made insofar as they do not depart from the spirit or scope of the present invention.

Priority is claimed on Japanese Patent Application No. 2013-242277, filed Nov. 22, 2013, the disclosure of which is incorporated herein by reference.

All references, patent applications and technical specifications cited in the present specification are incorporated by reference into the present specification to the same extent as if the individual references, patent applications and technical specifications were specifically and individually recited as being incorporated by reference.

The invention claimed is:

1. An armrest structure for door trim, the armrest structure comprising:
    an armrest lower that is formed on a door trim;
    an armrest upper that is attached to a top portion of the armrest lower; and
    a joining component that joins the armrest upper and the armrest lower together, wherein:
    the joining component comprises: a strap portion that has one end portion joined to the armrest upper, and that is inserted through an attachment hole formed in the armrest lower; and an anchor portion that is formed at another end portion of the strap portion,
    the attachment hole comprises a wider portion through which the anchor portion can be inserted, and a narrower portion through which the anchor portion cannot be inserted, and during a process to assemble the armrest upper and the armrest lower together, the anchor portion is inserted through the wider portion, and once the armrest upper and the armrest lower are in an assembled state, the anchor portion is located at a position underneath and separately from the narrower portion of the attachment hole that is formed in the armrest lower, and
    in the assembled state, the strap portion has a bent portion that is bent in a direction of the narrower portion of the attachment hole.

2. An armrest structure for door trim, the armrest structure comprising:
    an armrest lower that is formed on a door trim;
    an armrest upper that is attached to a top portion of the armrest lower; and
    a joining component that joins the armrest upper and the armrest lower together, wherein:
    the joining component comprises: a strap portion that has one end portion joined to the armrest upper, and that is inserted through an attachment hole formed in the armrest lower; and an anchor portion that is formed at another end portion of the strap portion,
    the attachment hole comprises a wider portion through which the anchor portion can be inserted, and a narrower portion through which the anchor portion cannot be inserted, and during a process to assemble the armrest upper and the armrest lower together, the anchor portion is inserted through the wider portion, and once the armrest upper and the armrest lower are in an assembled state, the anchor portion is located at a position underneath and separately from the narrower portion of the attachment hole that is formed in the armrest lower, and
    the anchor portion becomes gradually narrower towards a distal end in a direction of insertion through the attachment hole.

3. The armrest structure for door trim according to claim 1, wherein the strap portion is capable of elastic deformation.

4. An armrest structure for door trim, the armrest structure comprising:
    an armrest lower that is formed on a door trim;
    an armrest upper that is attached to a top portion of the armrest lower; and
    a joining component that joins the armrest upper and the armrest lower together, wherein:
    the joining component comprises: a strap portion that has one end portion joined to the armrest upper, and that is inserted through an attachment hole formed in the armrest lower; and an anchor portion that is formed at another end portion of the strap portion,
    the attachment hole is formed as an elongated hole and is long enough for the anchor portion to be inserted through it, a length of the attachment hole is longer than a width of the anchor portion and a width of the attachment hole is shorter than the width of the anchor portion, and during a process to assemble the armrest upper and the armrest lower together, the strap portion is deformed by being twisted such that the anchor portion passes through the attachment hole while extending in parallel with the long side, and
    once the armrest upper and the armrest lower are in the assembled state, the anchor portion is located at a position underneath the attachment hole that is formed in the armrest lower such that the anchor portion and the long side assume intersecting positions.

5. An armrest structure for door trim, the armrest structure comprising:
    an armrest lower that is formed on a door trim;
    an armrest upper that is attached to a top portion of the armrest lower; and
    a joining component that joins the armrest upper and the armrest lower together, wherein:
    the joining component comprises: a strap portion that has one end portion joined to the armrest upper, and that is inserted through an attachment hole formed in the armrest lower; and an anchor portion that is formed at another end portion of the strap portion,
    the attachment hole is formed as an elongated hole and is long enough for the anchor portion to be inserted through it, a length of the attachment hole is longer than a width of the anchor portion and a width of the attachment hole is shorter than the width of the anchor portion, and during a process to assemble the armrest upper and the armrest lower together, the armrest upper is rotated with respect to the armrest lower such that the anchor portion passes through the attachment hole while extending in parallel with the long side, and
    once the armrest upper and the armrest lower are in the assembled state, the anchor portion is located at a position underneath the attachment hole that is formed in the armrest lower such that the anchor portion and the long side assume intersecting positions.

6. The armrest structure for door trim according to claim 1, wherein the joining component has a fixing portion that is formed at the one end portion of the strap portion, and that is fixed to the armrest upper.

7. The armrest structure for door trim according to claim 1, wherein, in the joining component, the one end portion of the strap portion is formed integrally with the armrest upper.

8. The armrest structure for door trim according to claim 2, wherein the strap portion is capable of elastic deformation.

* * * * *